Aug. 25, 1970
O. K. NILSSEN
3,525,853
AUTOMOTIVE ELECTRIC QUICK HEAT SYSTEM
Filed Aug. 16, 1968
2 Sheets-Sheet 2
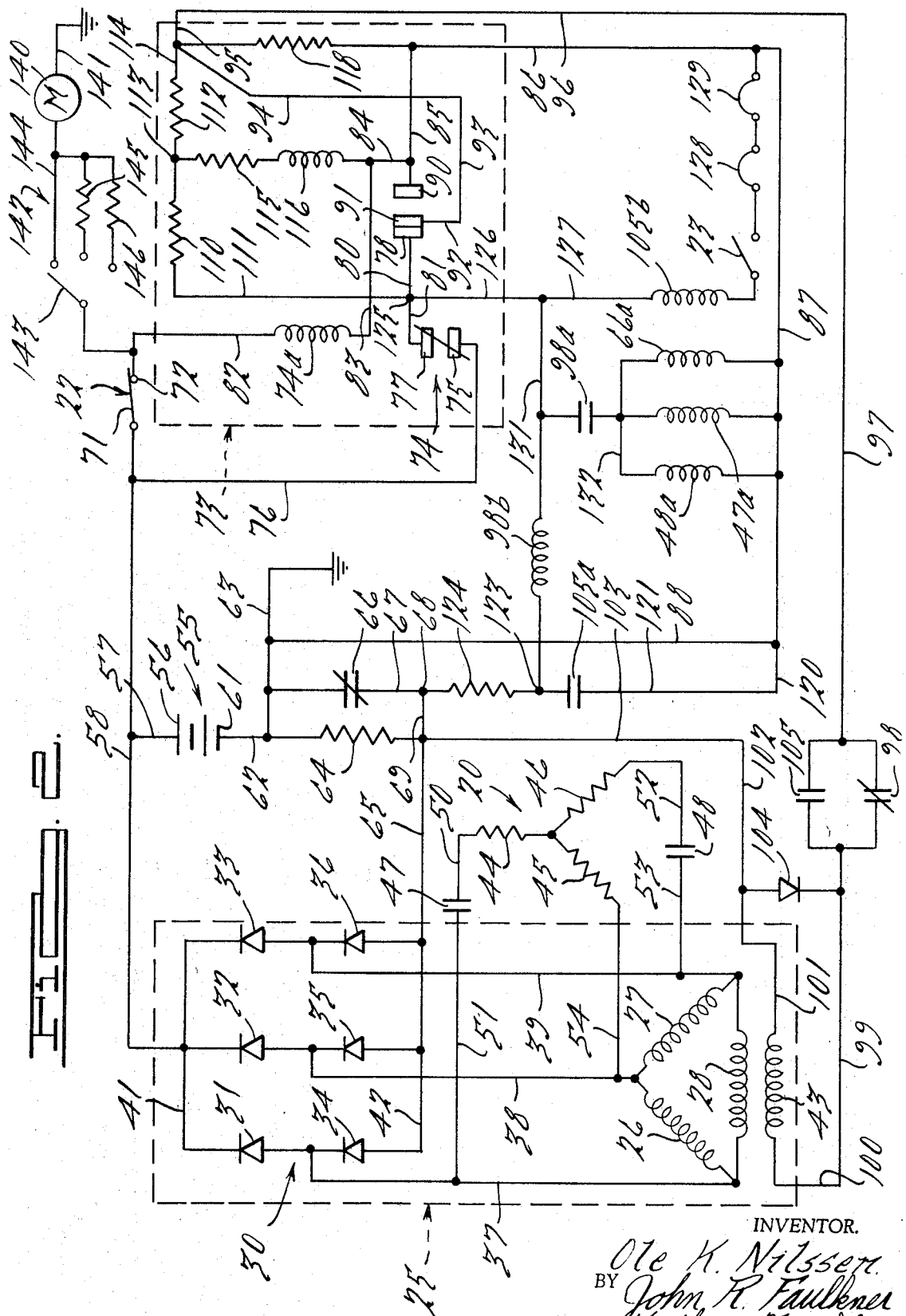
INVENTOR.
Ole K. Nilssen
BY John R. Faulkner
Keith L. Zeuschling
ATTORNEYS 3,525,853
AUTOMOTIVE ELECTRIC QUICK HEAT SYSTEM
Ole K. Nilssen, Bensenville, Ill., assignor to Ford Motor
Company, Dearborn, Mich., a corporation of Delaware
Filed Aug. 16, 1968, Ser. No. 753,173
Int. Cl. H05b 1/02
U.S. Cl. 219—482                    15 Claims

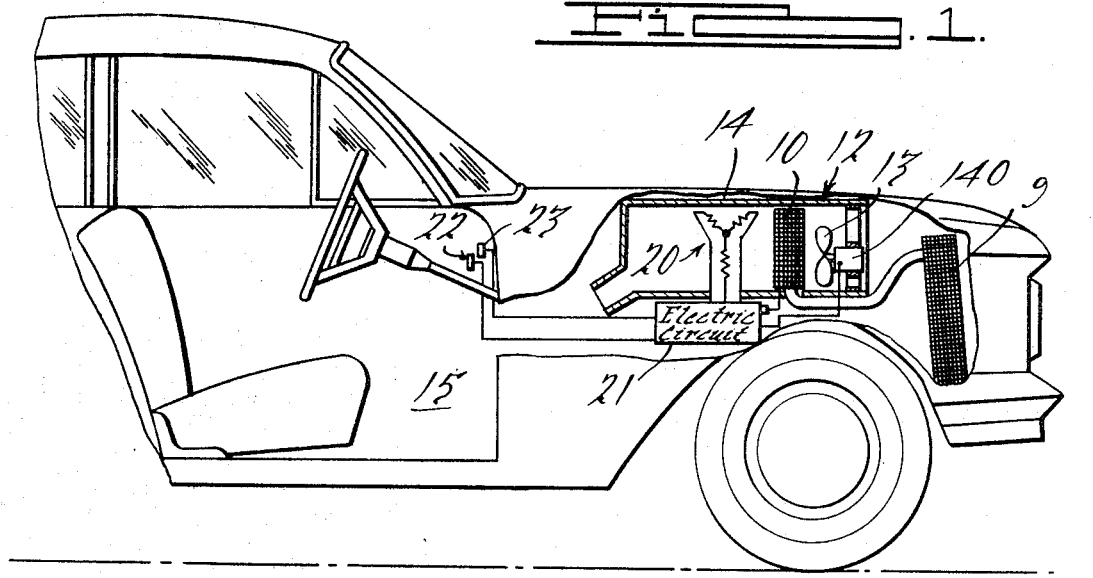
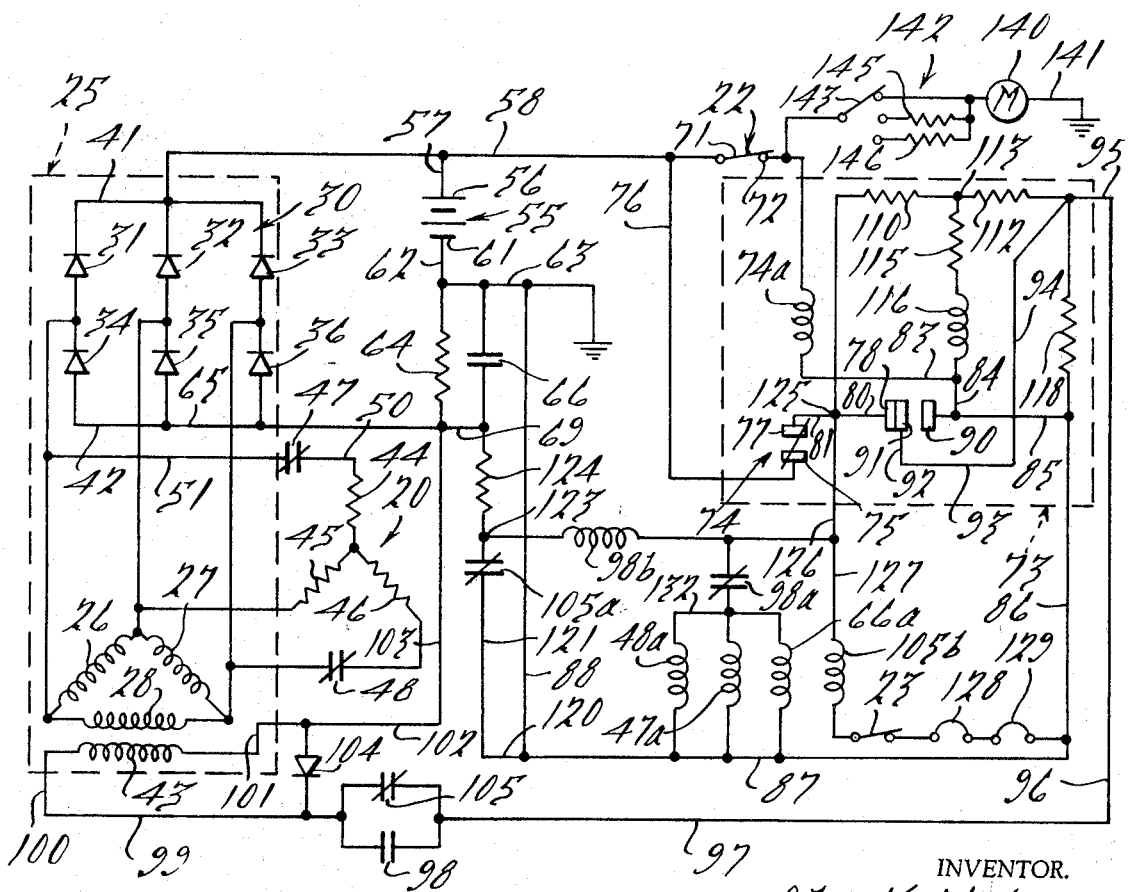

ABSTRACT OF THE DISCLOSURE

An automotive quick heat system in which an electrical heater means is in communication with the passenger compartment of the vehicle and is capable of being energized from the alternating current output windings of the alternator. Means are employed for substantially increasing the alternating current output from these windings when the electrical heater means is connected to them over their output when the alternator is operated in its normal regulated mode. The alternator output windings are coupled to a rectifier to supply direct current to the electrical storage battery of the vehicle and to the other direct current operated loads normally employed in an automotive vehicle. Means are employed in the above described system for reducing or eliminating transients that may be developed when the electrical heater means is disconnected from the alternating current output windings and the alternator is switched into its regulated mode of operation. This means permits the alternator output to decay to a value approximately equal to the regulated voltage level of the alternator, when it is under the control of a voltage regulator or limiter, prior to the time that the alternator is returned to its regulated mode of operation and the heater means is decoupled from the alternator output windings.

BACKGROUND OF THE INVENTION

The invention of this application relates to an improvement in the heating system for an automotive vehicle described and claimed in the U.S. Pat. 3,300,619 issued Jan. 24, 1967 in the name of Ole K. Nilssen and assigned to the assignee of this invention. In this patent there is disclosed and claimed an electrical quick heat system for an automotive vehicle in which heating coils positioned in communication with the passenger compartment of an automotive vehicle are energized from the alternating current output windings of an alternator to provide quick heat to the vehicle occupants. It is especially adapted for use with the conventional heating system of the vehicle which, of course, provides heat by means of a heat exchanger through which the engine coolant is circulated. There is considerable delay time between the time that an engine is started and the coolant temperature reaches a level where it can provide substantial amounts of heat to the passenger compartment. The quick heat system disclosed in the above mentioned patent may be used prior to the time that the conventional system is able to supply this substantial amount of heat. An automatic control means may be employed to switch the electrical heater means to its unenergized state when the temperature of the coolant in the engine reaches a pre-established level.

In the system disclosed in the above mentioned patent, the output of the alternator is switched by suitable means to produce sufficient electrical energy to cause very quickly the electrical heater means to produce sufficient heat to heat the passenger compartment. This may be accomplished by switching the alternator into an unregulated state of operation when the alternating current output windings are connected to the electrical heater means. An unregulated mode of operation implies that the alternator is operated in a regenerative mode where the full voltage output from the rectifier of the alternator is applied to the field winding.

The system may then be switched manually, or by the control means mentioned above when the conventional system is capable of applying substantial amounts of heat, to a state in which the alternator is returned to the control of the voltage limiter or regulator in the vehicle and the electrical heating means is disconnected from the alternating current output windings.

In the system described in the above mentioned patent, high transients may be generated in the output windings of the alternator when the system is switched from its quick heat mode of operation to its normal state of operation. These transients may damage the electrical system of the vehicle, particularly, the diodes of the alternator rectifier. The present invention provides a means for eliminating or reducing these transients to an extremely low level by permitting the alternator output to decay slowly to substantially the voltage level that it operates when the alternator is under the control of the voltage regulator or voltage limiter before the alternator is returned to the control of the voltage regulator or limiter and before the heater means is decoupled from the alternator output windings. This decay in the output voltage is accomplished at a rate which will prevent high current transients through the diodes of the rectifier.

SUMMARY OF THE INVENTION

This invention relates to an automotive electrical quick heat system for a passenger compartment of an automotive vehicle. It includes an electrical heater means in communication with the passenger compartment which is energized from the alternating current output windings of the alternator operated from the engine of the vehicle. The alternator in automotive vehicles includes a rectifier coupled to the alternating current output windings and a field winding which supplies the control for controlling the output of the alternating current output windings and the output from the rectifier. Switching means are coupled to the rectifier and the field windings for operating the alternator in a regulated mode when this switching means is in a first position and when in a second position for operating the alternator so that it produces substantially higher outputs of electrical energy than when operated in a regulated mode. This switching means may switch the alternator system so that it is operated in a completely unregulated mode in which DC output from the rectifier is fed back to the field winding in an uncontrolled regenerative way.

The switching means also couples the electrical heater means and the output windings of the alternator when the alternator is operated in an unregulated or regenerative mode of operation and decouples the heater means from the alternator output windings when the alternator is operated in its regulated mode.

The alternator produces an output voltage not exceeding a predetermined voltage level when it is operated in its regulated mode and this is done through a conventional voltage limiter or regulator. Means are coupled to the rectifier and the switching means upon moving the switching means to a position where it decouples the heater means from the alternator windings for permitting the output of the alternator to decay to a value approximately equal to this predetermined voltage level prior to the time when the alternator is returned to the regulated mode of operation and the heater means is decoupled from the alternator output windings.

The above described circuitry reduces or substantially eliminates transients through the electrical system of the vehicle and in particular through the diodes of the alternator when the alternator is switched from its unregulated mode of operation to its regulated mode of operation and heater means is decoupled from the alternator windings. This means preferably takes the form of a delay means which will, upon the actuation of either a manually operated switch or a switch connected to sense the temperature of fluid in the regular heating system, keep the alternator output windings coupled to the heater means and also keep the battery and other electrical systems from being directly coupled across the output windings of the rectifier until the output of the alternator decreases to the above mentioned predetermined level.

BRIEF DESCRIPTION OF THE DRAWINGS

FIG. 1 is a schematic diagram of the electrical quick heat system positioned in an automotive vehicle.

FIG. 2 is an electrical circuit diagram of the electrical quick heat system of the present invention when it is in its inoperative state or condition.

FIG. 3 is a circuit diagram of the electrical quick heat system of the present invention when it is in its operative state or condition.

DESCRIPTION OF THE PREFERRED EMBODIMENT

Referring now to the drawings in which like reference numerals designate like parts throughout the several views thereof, there is shown in FIG. 1 the overall heating system for a motor vehicle including the electrical quick heat system of the present invention. This system includes a primary heating means such as the radiator heating element 10 which is commonly used in an automotive vehicle heating system. The radiator heating element 10 is connected to radiator 9 of the internal combustion engine of the vehicle and is associated with a ventilation system 12 which includes fan 13 located adjacent radiator heating element 10 and conduit 14 which is operatively coupled to the radiator heating element 10 and the passenger compartment 15. The fan directs a stream of air over the radiator heating element 10 and through the conduit 14 into the passenger compartment 15 thereby heating the compartment. In addition to this conventional structure, the invention embodies an instant quick heat means such as electric heating coils 20 which are placed in the conduit 14. The fan 13 directs a stream of air over the radiator heating element 10 and the electric heating coils 20 thereby removing heat from both sources and directing it into the passenger compartment 15.

The electrc coils 20 are connected to an electric circuit 21 which controls the energization of the electric heating coils 20 and the fan 13. The ignition switch 22 and the control switch 23 are connected to the electrical circuit 21 and in part control the energization of the heating coils 20 and the electrical circuit 21 which circuit is described subsequently in detail.

The electric circuit 21 shown in FIGS. 2 and 3 includes an alternator 25 which is suitable for use in an automotive vehicle electrical system and is driven by the internal combustion engine of the vehicle. The alternator 25 may be a three phase alternator including armature or alternating current output windings 26, 27 and 28 that are connected in a delta arrangement. It should be understood, of course, that the armature or alternating current output windings 26, 27 and 28 could also be connected in a Y-arrangement. The alternator also includes a rectifier 30 having diodes 31, 32, 33, 34, 35 and 36 suitably connected through leads 37, 38 and 39 to the armature or alternating current output windings 26, 27 and 28 to produce at the rectifier terminals 41 and 42 a direct current which results from the rectification of the alternating current output from the armature or alternating current output windings 26, 27 and 28. The alternator 25 also includes a field winding 43, that may be positioned on a driven rotor driven by the internal combustion engine of the vehicle, that controls the output of the armature or alternating current output windings 26, 27 and 28.

The diodes 31 through 36 are, in an automotive vehicle alternator, generally constructed of semiconductive material and are usually silicon diodes. These diodes have a rated capacity with respect to current flow to permit without damage ordinary electrical currents produced by the alternating current output windings 26, 27 and 28 to flow through them to the terminals 41 and 42 of the rectifier.

As stated previously, FIG. 2 discloses the electrical quick heat system of the present invention in combination with the alternator of the vehicle when the electrical quick heat system is in its inoperative condition or state. The electrical heater means or coils 20 which may be in the form of Y-connected electrical heater resistors 44, 45 and 46 are connected to be energized, when the electrical quick heat system is switched to its operative state, through normally open contacts 47 and 48 to the alternating current or armature windings 26, 27 and 28. To accomplish this purpose one terminal of the electrical heater resistor 44 is positioned to be connected through normally open switch 47 via leads 50 and 51 to the lead 37. The electrical resistor 46 is positioned to be connected to the lead 39 through the normally open switch 48 and leads 52 and 53, while the electrical heater resistor 45 is connected to the lead 38 through lead 54.

The electrical circuit 21 includes a storage battery 55 of the automotive vehicle having a positive terminal 56 connected through leads 57 and 58 to the positive terminal 41 of the rectifier 30. The negative terminal 61 of the electrical storage battery 55 is connected to ground through leads 62 and 63 and is also connected to the negative terminal 42 of the rectifier 30 through electrical resistor 64 having one terminal connected to the junction of leads 62 and 63 and the other terminal connected to the negative treminal 42 of the rectifier 30 through lead 65. A normally closed switch 66 shunts the resistor 64 by having one terminal connected to the lead 63 and the other terminal connected to lead 65 via lead 67, junction 68 and lead 69. The lead 58 from the positive terminal 41 of the rectifier 30 is connected to movable blade 71 of ignition switch 22 and this movable blade is in contact with a fixed contact 72 when the ignition switch is closed.

The electric circuit 21 also comprises a substantially conventional voltage regulator or limiter 73 which comprises a pair of normally open contacts 74 having one contact 75 connected through lead 76 to lead 58 and hence the positive terminal 41 of the rectifier 30 and the positive terminal 56 of the battery 55. The other contact 77 of the normally open contacts 74 is movable and is connected to a fixed contact 78 through lead 80 and movable arm 81.

A solenoid or relay winding 74a has one terminal connected to the fixed terminal 72 of ignition switch 22 via lead 82. The other terminal of the solenoid or relay winding 74a is connected to ground or the negative terminal 61 of the electrical storage battery 55 via leads 83, 84, 85, 86, 87 and 88. Thus when the ignition switch 22 is closed, as shown, so that the movable blade 71 is in contact with the fixed contact 72 the winding 74a is energized and the normally open contacts 74 operated by solenoid or relay winding 74a are closed, as shown, so that contacts 75 and 77 are in electrical engagement with one another.

The voltage regulator 73 also includes a second fixed contact 90 connected to ground through leads 85, 86, 87, 88 and 63 and also to the negative terminal 61 of the electrical storage battery 55 through these leads and lead 62. The voltage regulator also includes a movable contact 91 connected to one terminal of the field winding 43 through movable arm 92, leads 93, 94, 95, 96, 97, normally closed contacts 98 and leads 99 and 100. The other end or terminal of the field winding 43 is connected to ground and to the negative terminal 61 of the electrical storage battery 55 through leads 101, 102, 103, 69, junction 68, normally closed contacts 66 and leads 63 and 62. The conventional diode 104 is connected across the field winding 43 to provide a current path for the current flowing through the field winding 43 when it is de-energized either on a periodic basis by the electrical voltage limiter or regulator 73 or by the switching of the electrical quick heat system as will be described subsequently. It can be seen also that the leads 97 and 99 are capable of being connected by normallly open contacts 105 that are connected in parallel with the normally closed contacts 98.

The voltage limiter or regulator 73 aso incudes a resistor 110 having one terminal connected to the movable arm 81 of contact 77 through lead 111, a second resistor 112 connected to a junction 113 and to lead 95 through lead 114. A third resistor 115 is connected to the junction 113 and to one terminal of a solenoid or relay winding 116. The other terminal of this solenoid or relay winding 116 is connected to the lead 84 and hence to ground through leads 85, 86, 87 and 88. A resistor 118 is connected between the junction of leads 114 and 95 and to the junction of leads 85 and 86.

This voltage regulator 73 is of standard construction and when the contacts 74 are closed by the energization of the solenoid or relay winding 74a, voltage is applied from the positive terminal 41 of the rectifier 30 through lead 58, lead 76 and closed contacts 77 to lead 80. This applies a voltage through lead 111, resistor 110, resistor 115 to solenoid or relay winding 116. This winding 116 will sense the voltage applied to it including the output voltage of the alternator appearing across the rectifier and vibrate the movable contact 91 between a position where it is in contact wtih the fixed contact 78 and an open position thereby energizing the field winding 43 through the circuits previously described on a periodic basis. When a higher voltage level appears at the positive terminal 41 of the rectifier 30, the movable contact 91 will vibrate, due to this increased voltage appearing across the solenoid or relay winding 116, between an open position and a position where it is in contact with the fixed contact 90. As a result, when movable contact 91 is in contact with fixed contact 78, field winding 43 is energized directly from the battery 55 and the rectifier 30. When the contact 91 is in the midway or open position, the field winding 43 will be energized at a lower level through resistors 110 and 112, and when the movable contact 91 is in engagement with the contact 90, the field winding will be grounded. This is a normal operation for a voltage limiter or regulator and further description of it is deemed unnecessary.

The switching means for switching the electrical quick heat system of the present invention also includes normally open contacts 105a that have one terminal connected to lead 87 through leads 120 and 121 and the other terminal connected to a junction 123. A resistor 124 is connected between the junctions 123 and 68. A solenoid or relay winding 105b has one terminal connected to the movable contact 77 of contacts 74 through arm 81, junction 125, lead 126 and lead 127. The other terminal of the solenoid or relay winding 105b is connected to ground through the control switch 23 that is manually operated by the vehicle operator to switch the electrical quick heat system into and out of its operating mode or state; through a thermal switch 128 that is positioned to sense the temperature of the engine coolant in the radiator 9 or the radiator heating element 10 disclosed in FIG. 1, through a second thermally operated switch 129 that is in the form of a fuse positioned adjacent the heating coils 20, and provides a safety means for the electrical quick heat system, and through leads 87, 88, 63.

A set of normally open contacts 98a has one terminal connected to lead 131 and the other terminal connected to lead 132. The lead 131 is also connected to be energized from the movable contact 77 of the contacts 74 through lead 81, junction 125, lead 126. The lead 131 is connected to one terminal to a solenoid or relay winding 98b and the other end of the relay winding or solenoid 98b is connected to the junction 123 and hence to ground through the resistor 124, junction 68, lead 67, normally closed contacts 66 and lead 63 and also to the negative terminal 61 of the battery or electrical storage means 55 by the lead 62 connected to lead 63. Relay windings or solenoids 48a, 47a and 66a are connected in parallel between the lead 132 and the lead 87 and, therefore, the lower terminals of these solenoids or relay windings are connected to ground through the lead 87 and lead 88.

An electrical motor 140 has one terminal connected to ground through a lead 141 and the other terminal connected to a three terminal switch 142 which has a movable blade 143 connected to fixed contact 72 of the ignition switch 22. The movable blade 143 of the three position switch 142 may energize the motor 140 for three speed operation either through lead 144, resistor 145 or resistor 146 to thereby provide three speed operation of the motor 140 which is connected to the fan 12 shown in FIG. 1 that forces air through the heater radiator 10 and the electrical quick heat coils 20.

In the operation of the circuit shown in FIG. 2, ignition switch 22 when closed sends a current through winding 74a of the voltage regulator or limiter 73. This closes the normally open contacts 74 so that fixed contact 75 and movable contact 77 are in engagement with one another. The voltage regulator 73 then controls electrical energy flowing to the field winding 43 to control the output voltage appearing across the rectifier terminal 41 and 42 at a predetermined upper limit or level. This upper limit or level is ordinarily approximately 14 volts when an electrical storage battery 55 is a 12 volt battery.

It should be noted that the solenoid or relay winding 98b is connected to the positive terminal 41 of the rectifier 30 and the positive terminal 56 of the storage battery 55 through lead 58, lead 76, closed contacts 74 including fixed contact 75, movable contact 77, movable arm 81, junction 125, lead 126 and lead 131. The other end of the solenoid or relay winding 98b is connected to ground through the junction 123, the resistor 124 and normally closed contacts 66 and lead 63. The resistor 124 is sufficiently large that current flow through the solenoid or relay winding 98b is not large enough to operate contacts 98a and 98 which are connected to be operated from this solenoid or relay winding.

Also, since the control or actuating switch 23 is open, there will be no current flow through solenoid or relay winding 105b and, therefore, contacts 105 and 105a will not be actuated and will remain in their open position. Moreover, since normally open contacts 98a are maintained in the open position, the solenoid or relay windings 48a, 47a and 68a will not be energized and the normally open contacts 47 and 48 will remain open and the normally closed contacts 66 will remain closed.

It should be noted that the normally closed contacts 66 shunt the resistor 64 so that the negative terminal 42 of the rectifier 30 is connected through leads 65, 69, 67, normally closed contacts 66 and leads 63 and 62 to ground and the negative terminal 61 of the storage battery 65. In this condition then the heater means or electrical coils 20 comprised of electrical resistors 44, 45 and 46 will not be energized and the remainder of the generating system for the vehicle will operate in a conventional way.

The electrical quick heat system as brought out in the first portion of the specification provides quick heat to the passenger compartment of the vehicle on a cold day, particularly, when it takes considerable time for the engine coolant to reach a temperature where the heater radiator 10 can supply a sufficient amount of heat to the passenger compartment 15 to make the interior of the compartment comfortable to passenger vehicles. As a result, at this time the vehicle operator, after closing the ignition switch 22 or prior to doing so, will close the control switch 23 and these two switches are shown in their closed position in FIG. 3, which shows the electrical circuit 21 in a condition in which the electrical heating means 20 is energized.

When the vehicle has been at rest for some period of time, both the thermally actuated switches 128 and 129 are closed since the engine coolant temperature is low and the heater coils or heater means 20 have not yet been energized. Upon the closing of ignition switch 22 and control switch 23, electrical energy is applied to the solenoid or relay winding 105b from the positive terminal 41 of rectifier 30 and the positive terminal 56 of the battery 55 through leads 58, lead 57, closed contacts 74, that have been closed when the ignition switch 22 was closed through the action of solenoid or relay winding 74a, the junction 125, lead 126 and lead 127.

Energization of the solenoid or relay winding 105b closes normally open contacts 105 and 105a. As a result, the resistor that connects one side of solenoid or relay winding 98b to ground, i.e., resistor 124 is shorted out and this side of the solenoid or relay winding 98b is connected to ground through junction 123, closed contacts 105a, lead 121, lead 120, lead 88 and lead 63. This provides sufficient electrical energy through the solenoid or relay winding 98b to close normally open contacts 98a. Closing of the normally open contacts 98a energizes solenoid of relay windings 48a, 47a and 68a. Energizing of windings 48a and 47a close normally open contacts 47 and 48 so that they are now in the closed position. The solenoid or relay windings 48a, 47a and 68a are preferably arranged to have sufficient current through them so that the normally opened contacts 47 and 48 are closed simultaneously and are closed prior to the time that solenoid or relay winding 68a opens normally closed contacts 66. It should be noted also that the energization of the solenoid or relay winding 98b as described above opens normally closed contacts 98.

As a result of the above described switching action, the electrical quick heat system or electrical circuit 21 is switched into its electrical quick heat operating mode, as shown in FIG. 3. The heater means or coils 20 are connected through closed contacts 47 and 48 to the armature or output windings 26, 27 and 28 thereby causing an alternating current energy from the output windings 26, 27 and 28 of the alternator to flow through the heater resistors or coils 44, 45 and 46. The resistor 64 is connected, by the opening of the normally closed contacts 66, in series with the battery 55 across the output terminals 41 and 42 of the rectifier 30. The resistor 64 is sized or designed so that when the alternator is operated in its uncontrolled or regenerative mode, as will be described subsequently, the voltage drop across it is such that the difference between the output of the alternator 25 that appears across the terminals 41 and 42 of the rectifier 30 is equal to the total output voltage minus the voltage of the battery 55. When the alternator is operated in this unregulated or regenerative mode, it may produce an output voltage in the neighborhood of 50 volts; therefore, approximately 38 volts appears across the resistor 64 and approximately 12 volts, the terminal voltage of the battery 55, appears across the battery. At the same time the electrical resistor or heater coils 44, 45 and 46 of the heater means 20 are energized by the unregulated output from the alternating current output windings 26, 27 and 28 of the alternator 25.

As the output voltage of the alternator increases, the voltage appearing between the positive terminal 41 of the rectifier 30 and ground will be maintained substantially constant at the terminal voltage of the battery. It should be noted that the solenoid or coil 116 is connected, as previously described, to the positive terminal of the battery 56 via leads 58, lead 76, closed contacts 74, lead 81, resistor 110, junction 113, lead 115 and then to ground through leads 84, 85, 86, 87 and 88. Therefore, this coil will see only the battery voltage and will not see the increasing voltage of the alternator as it is operated in its regenerative mode. As a result, the regulator or voltage limiter 73 is rendered substantially inoperative and the movable contact 91 will remain in contact with the fixed contact 78.

Because of the above described action, the field winding 43 is connected directly across the output terminals 41 and 42 of the rectifier 30. This circuit may be traced from the positive terminal 41 of the rectifier 30 through lead 58, lead 76, closed contacts 74, movable arm 81, lead 80, contact 78, contact 91, lead 92, lead 93, lead 94, lead 95, lead 97, closed contacts 105, lead 99 and lead 100. The other terminal of the field winding 43 is connected to the negative terminal 42 of the rectifier 30 through lead 101, lead 102, lead 103 and lead 65. As a result, the output voltage appearing across the terminals 41 and 42 of the rectifier 30 is fed directly to the field winding 43 and as the voltage builds up across the output terminals 41 and 42, the increasing energization of the field winding 43 causes an increasing output voltage of the alternator 25 which is limited only by the inductive reactance and resistance of the armature or alternating current output windings 26, 27 and 28. As stated previously, this output may reach the neighborhood of 50 volts; and this alternating energy, in the neighborhood of 50 volts, is applied to the heater means or heater coils 20 comprising resistors 44, 45 and 46. As a result, a very substantial amount of heat is generated in the heater means 20. The vehicle operator may turn the fan 13 to any of three speeds by movement of the switch blade 143 of switch 142 which operates the motor 140 connected to the fan at three different speeds to cause heated air to enter the passenger compartment 15 through conduit 14.

When sufficient heat from the electrical quick heat system has been supplied to the vehicle operator to make him comfortable, he may turn off the electrical quick heat system or switch it to its inoperative state by openng the control switch 23. On the other hand, the electrical quick heat system may be switched to its inoperative condition by the operation of the termal switch 128 which senses the temperature of the engine coolant and will open when this temperature reaches a level where a substantial amount of heat can be supplied to the passenger compartment 15 by the heater radiator 10. The system may also be switched to its inoperative condition if the heater means 20 overheats by means of thermally actuated fuse 129.

When any one of the three switches 23, 128 or 129 are opened, the solenoid or relay winding 105b is de-energized. When this happens the contacts 105 and 105a, which are closed when the electrical quick heat system is in the operative condition, as shown in FIG. 3, are opened. The opening of contacts 105 open circuits the field winding 43; and it is, therefore, no longer energized. As a result, the output from the armature or alternating current output windings 26, 27 and 28 starts to decay or decrease. It should also be noted that the opening of the contacts 105a disconnects the one terminal of the solenoid or relay winding 98b from ground and connects it to the negative terminal 42 of the rectifier 30 through resistor 124. The current through the series circuit comprised of the solenoid winding or relay winding 98b and resistor 124 generates sufficient electrical energy in the solenoid or relay winding 98 to keep the contacts operated by it in their positions, as shown in FIG. 3, until the output of the alternator 25 appearing across the rectifier terminals 41 and 42 decreases or decays to approximately the terminal voltage of the battery or the level of the output voltage from the alternator 25 when it is operated in its regulated mode. As a result, contacts 47 and 48 remain closed as do contacts 66 until the output voltage decays to approximately the battery voltage, or the above mentioned level of output voltage from alternator 25, and this occurs gradually and at a time determined by the time constant of the resistor 124 and the solenoid or relay winding 98b. As a result, the output voltage and current flow through the rectifier 30 including diodes 31, 32, 33, 34, 35 and 36 is gradually decreased and very little, if any, transient voltages or currents are created by this time delaying switching action.

When the output voltage appearing across the rectifier terminals 41 and 42 does decay to approximately the battery voltage or the level of output voltage from the alternator when it is operated in its regulated mode, the solenoid or relay winding 98b no longer has sufficient current flow through it to keep the contacts 98a closed and contacts 98 open. As a result, contacts 98a open and contacts 98 close so the circuit returns to the position as shown in FIG. 2 with respect to these contacts. Opening of the contacts 98a de-energizes the solenoid or output windings 48a, 47a and 68a. As a result, the closed contacts 47 and 48 are opened and the electric heater means or coils 20 are disconnected from the armature or output windings 26, 27 and 28 of the alternator 25. Shortly thereafter, the current flow through the solenoid or relay winding 68a decreases to the point where the contacts 66 are switched from the opened position to the closed position thereby shorting out resistor 64.

At this time, the voltage limiter or regulator 73 comes back into play and establishes control of the output of the alternator, as previously described, since the system has been returned to the circuit position, as shown in FIG. 2. Therefore, the electrical quick heat system has been switched to an inoperative state or condition and the alternator has been returned to its regulated mode of operation.

Thus, the present invention provides an electrical quick heat system in which heater coils are positioned to be in communication with the passenger compartment of an automotive vehicle and are operated by the alternating current output windings of the alternator with the alternator being operated in such a way that it produces substantially more voltage than it does when it is operated in its regulated condition. Moreover, the alternator as described above, may be operated in a completely unregulated regenerative feedback mode to produce very high voltage outputs and energy inputs into the heater windings. When the system is switched so that the electrical quick heat system is de-energized or rendered inoperative, the present invention substantially reduces or eliminates any transients that would otherwise be generated and might damage the electrical system of the automotive vehicle, particularly the rectifier diodes 31 through 36. It can be seen that the invention through the time delay means described above causes a gradual decay or decrease in the output voltage of the alternator as the quick heat system is switched to its inoperative condition. This prevents any large surges of current from the output windings that might otherwise flow through the diodes of the alternator when the heater means 20 is disconnected from the alternator output windings. If the switching system, including the time delay means described above were not provided, 100 amps might be generated on a transient basis through each diode from the alternator output windings and would flow through each of the alternator diodes. This is substantially in excess of the rated current capacity of diodes ordinarily employed with alternator rectifiers and may short them or damage them severely due to the excess current.

It should be noted also that when the quick heat system of the present invention is in its operating mode, the remainder of the electrical components of the vehicle can be operated from the electrical energy supplied through the battery and that portion of the output voltage generated across the output terminals 41 and 42 of the rectifier 30 that is not absorbed or dissipated in the resistor 64. This is true since these components are connected at one terminal to the ignition switch and are connected at their other terminals to ground, as is the negative terminal of the battery 55.

The invention disclosed will have many modifications which will be apparent to those skilled in the art in view of the teachings of this specification. It is intended that all modifications which fall within the true spirit and scope of this invention be included within the scope of the appended claims.

What is claimed is:

1. In an automotive vehicle, a passenger compartment, an electric heater means positioned to supply heat to said passenger compartment, an alternator comprising an alternating current output winding, a field winding and a rectifier connected to said output winding, a vehicle electrical system including a storage battery connected to said rectifier, a regulator coupled to said rectifier and said field winding for limiting the amount of electrical energy from said output winding whereby said alternator is operated in a regulated mode, means coupling said rectifier and said field winding for operating said alternator in a regenerative unregulated mode, and means coupled to said last mentioned means and said regulator for causing said alternator to operate either in its regulated or unregulated mode of operation, said alternator furnishing sufficient electrical energy to said electric heater means when operated in the unregulated mode to cause a substantial amount of heat to be supplied to said passenger compartment of said vehicle, and means coupled to said last mentioned means for coupling said electrical heater means to the output winding when said alternator is operated in its unregulated mode of operation, and for decoupling said electrical heater means from said output means when said alternator is operated in its regulated mode of operation, and means coupled to said rectifier, and said field winding for preventing large electrical transients from flowing through said rectifier as said alternator is switched from its unregulated mode of operation to its regulated mode of operation and said heater means is decoupled from said alternator output windings.

2. The combination of claim 1 in which said last mentioned means comprises means for open circuiting said alternator field winding and permitting the output of said alternator to decrease at a predetermined rate to the approximate level of its output voltage when operated in the regulated mode prior to the decoupling of said heater means from said output windings.

3. The combination of claim 2 in which a resistor is connected in series circuit with said battery, the series circuit of said battery and resistor being connected across said rectifier, a normally closed switch means shunting said resistor, and means coupled to the output circuit of said rectifier for operating said switch means, said last mentioned means comprising means for opening said switch means when said alternator is operated in its unregulated mode whereby the voltage appearing across said battery when said alternator is operated in its unregulated mode is approximately equal to the terminal voltage of said battery and below the voltage at which said regulator will come into operation, said means coupled to the output circuit of said rectifier for operating said switch means including delay means for delaying the opening of said switch means until the output voltage of said alternator has decayed to approximately the voltage at which said regulator will come into operation and to approximately the terminal voltage of said battery.

4. The combination of claim 3 in which said delay means for delaying the operation of said switch means is connected in series with the output terminals of said rectifier.

5. A heating system for an automotive vehicle having a passenger compartment, comprising an electrical heater means in communication with the passenger compartment of the vehicle, an alternator comprising output windings, a field winding and a rectifier, said rectifier having input leads connected to the output windings and a pair of output terminals, an electrical storage battery having a pair of terminals, one of said terminals being connected to one of the output terminals of said rectifier, limiting means coupled to the output terminals of said rectifier, said field winding and said battery for limiting the output voltage of said alternator to a predetermined voltage level, switching means coupled to said limiting mentioned means for limiting the effectiveness of said limiting means whereby the output of said alternator is substantially increased above said predetermined voltage level and for coupling said electrical heater means to the output windings of said alternator when said switching means is actuated, and means coupled to the output terminals of said rectifier and said switching means upon de-actuation of said switching means, for causing the output voltage of said alternator to decrease at a predetermined rate to a level approximating said predetermined voltage level prior to decoupling said heater means from said output windings of said alternator and for restoring the full effectiveness of said limiting means whereby large electrical transients are prevented from flowing through said rectifier.

6. The combination of claim 2 in which said rectifier is comprised of a plurality of semiconductor diodes and said last mentioned means prevents high current transients from flowing through said semiconductor diodes when said switching means is de-actuated.

7. The combination of claim 6 in which said last mentioned means comprises a resistor connected in series with said electrical storage battery, said resistor and electrical storage battery being connected across the output terminals of said rectifier, second switch means coupled across said resistor and connected to one terminal of said rectifier and one terminal of said battery, circuit means coupling said second switch means with said first switch means for closing said second switch means when said first switch means is activated and for closing said second switch means when said first switch means is de-activated, said resistor having a value such that the voltage drop across it is approximately equal to the difference between the output voltage of said alternator and the voltage drop across said battery.

8. The combination of claim 7 in which circuit means coupling said second switch means with said first switch means comprises time delay means having one terminal connected to one terminal of said rectifier and the other terminal connected to the other terminal of said rectifier.

9. The combination of claim 8 in which said one terminal of said electrical storage battery is connected to ground and the other terminal is connected to the other terminal of said rectifier.

10. An automotive quick heat system for a passenger compartment of an automotive vehicle comprising an electrical heater means in communication with the passenger compartment, an alternator comprising alternating current output windings, a rectifier coupled to said alternating current output windings and a field winding, a switching circuit means, and means coupled to said rectifier and said field winding for operating said alternator in a regulated mode of operation when said switching circuit means is in an open position, said alternator producing an output voltage not exceeding a predetermined level when operated in its regulated mode, and means coupled to said electrical heater means, said output windings and said rectifier of said alternator for coupling said electrical heater means to said alternator output windings and for causing said alternator to produce an output voltage substantially in excess of said predetermined level when said switching circuit means is in a closed position, and means coupled to said rectifier and said switching circuit means for preventing large electrical transients from being generated in said alternator output windings when said switching circuit means is actuated from said closed position to said open position.

11. The combination of claim 10 in which said rectifier comprises a plurality of semiconductor diodes, and said last mentioned means prevents large transient currents from flowing through said diodes as said alternator is switched from its state where it is producing voltages substatnially in excess of said predetermined voltage level to its regulated mode of operation.

12. The combination of claim 11 in which a radiator heating means receiving engine coolant from the engine of the vehicle is positioned in communication with the passenger compartment, and means are employed for sensing the temperature of engine coolant and for opening said switching circuit means when the temperature of the engine coolant reaches a predetermined level where said radiator heating means is capable of supplying a substantial amount of heat to the passenger compartment.

13. The combination of claim 12 in which said last mentioned means includes time delay means coupled to said switching circuit means for delaying the decoupling of said alternator output windings from said electrical heater means until the output of said alternator has decreased to a level substantially equal to said predetermined level.

14. The combination of claim 13 in which said time delay means is coupled between the output terminals of said rectifier when said switching circuit means is in an open position.

15. The combination of claim 14 in which an electrical storage battery and a resistor are connected in series across the output terminals of said rectifier, and a switch means is connected across said resistor, said switch means being operatively coupled to said switching circuit means and said time delay means, said switching circuit means including means for opening said switching means when said switching circuit means is moved to a closed position, and said time delay means including means for delaying the closing of said switch means when said switching circuit means is moved to a closed position until the output of the alternator has decreased to a level substantially equal to said predetermined level and the terminal voltage of said battery.

References Cited

UNITED STATES PATENTS 3,440,398   4/1969   Nilssen _____ 219—505

BERNARD A. GILHEANY, Primary Examiner

F. E. BELL, Assistant Examiner

U.S. Cl. X.R.
219—279